(12) United States Patent
Farrell et al.

(10) Patent No.: US 7,805,440 B2
(45) Date of Patent: Sep. 28, 2010

(54) SYSTEM AND METHOD FOR SIMPLIFYING AND MANIPULATING K-PARTITE GRAPHS

(75) Inventors: Robert G. Farrell, Cornwall, NY (US); Douglas N. Gordin, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 1618 days.

(21) Appl. No.: 10/496,778

(22) PCT Filed: Apr. 5, 2002

(86) PCT No.: PCT/US02/11098

§ 371 (c)(1),
(2), (4) Date: May 24, 2004

(87) PCT Pub. No.: WO02/084431

PCT Pub. Date: Oct. 24, 2002

(65) Prior Publication Data

US 2005/0038533 A1      Feb. 17, 2005

Related U.S. Application Data

(60) Provisional application No. 60/283,013, filed on Apr. 11, 2001.

(51) Int. Cl.
*G06F 7/00* (2006.01)
*G06F 17/30* (2006.01)
(52) U.S. Cl. ..................................... 707/728
(58) Field of Classification Search ....................... None
See application file for complete search history.

(56) References Cited

U.S. PATENT DOCUMENTS 5,701,480 A    12/1997   Raz (Continued)

OTHER PUBLICATIONS

International Search Report, Oct. 23, 2003.

(Continued)

*Primary Examiner*—Neveen Abel Jalil
*Assistant Examiner*—Michael J Hicks
(74) *Attorney, Agent, or Firm*—F. Chau & Associates, LLC

(57) ABSTRACT

The system has a collection of a plurality of objects. Each object defines a node in a k-partite graph, such that, the nodes can be divided into a number of mutually exclusive sets such that all of the nodes are in exactly one of the sets; further edges occur only between nodes in different sets; The system also has a simplification process that aggregates one or more of the nodes into one or more categories and identifies a category node corresponding to each category. The category node inherits the mode and the edges of all the nodes in the respective category. Further, the system contains Directed Acyclic Graphs Indices (DAGIs) whose nodes may have a 1-1 mapping with the nodes in the k-partite graph. These indices can be used to aggregate and hide nodes in the k-partite graph. Aggregation occurs by selecting one or more non-leaf nodes in the DAGI and aggregating all descendent nodes. Hiding occurs by selecting some set of DAGI nodes, thus selecting some corresponding set of nodes in the k-partite graph, and requesting this set of nodes be hidden which effectively removes them from further consideration until they are restored by explicit request.

5 Claims, 15 Drawing Sheets

U.S. PATENT DOCUMENTS

| | | | |
|---|---|---|---|
| 5,864,851 A | | 1/1999 | Breitbart |
| 5,999,931 A | | 12/1999 | Breitbart |
| 6,105,018 A | * | 8/2000 | Demers et al. ................. 707/2 |
| 6,751,622 B1 | * | 6/2004 | Puri et al. ................... 707/101 |

OTHER PUBLICATIONS

International Publication No. WO 02/084431 A3, Search Report.
International Publication No. WO 02/084431 A2.

* cited by examiner

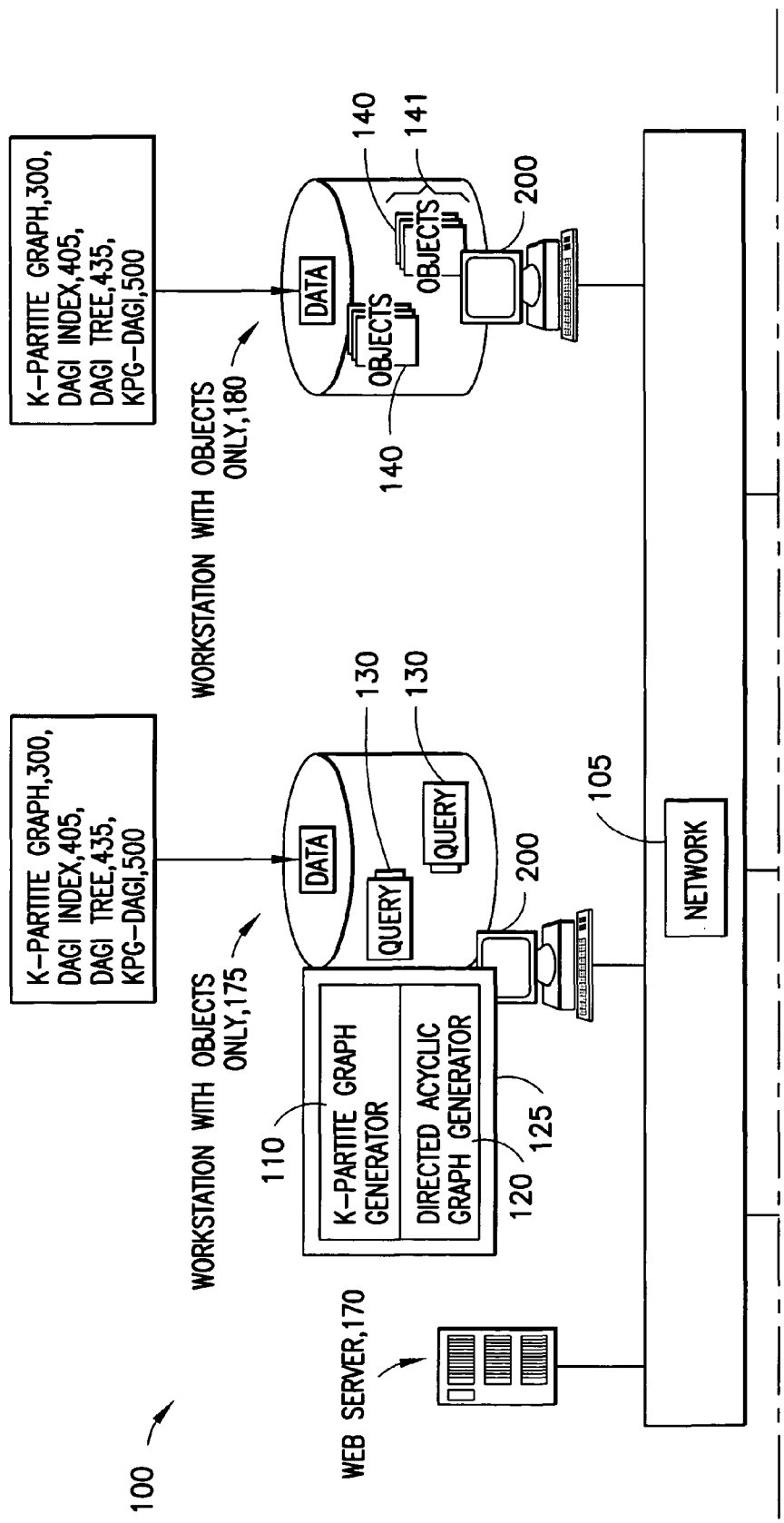

| FIG.2A |
|--------|
| FIG.2B |
| FIG.2C |

| NAME 310 | EDGES 320 | MODE 330 | HIDDENP 340 | SELECTEDP 350 | INAGGP 360 | INAGGNEXT 370 | AGGP 380 | NEXT 390 |
|---|---|---|---|---|---|---|---|---|
| NODE 1 | | | | | | | | |
| NODE 2 | | | | | | | | |
| NODE 3 | | | | | | | | |
| ... | | | | | | | | |
| NAME z | | | | | | | | |

FIG. 3

| NAME | DNODE | KNODE |
|------|-------|-------|
| NODE 1 | | |
| NODE 2 | | |
| NODE 3 | | |
| ... | | |
| NAME z | | |

FIG. 4A

| NAME | DNODE | TNODE | NEXT |
|------|-------|-------|------|
| NODE 1 | | | |
| NODE 2 | | | |
| NODE 3 | | | |
| ... | | | |
| NAME z | | | |

| NAME 510 | KPARTITE_GRAPH 520 | DAGI 530 | INFERREDP 540 | NEXTINDEX 550 |
|---|---|---|---|---|
| INDEX 1 | | | | |
| INDEX 2 | | | | |
| INDEX 3 | | | | |
| ... | | | | |
| INDEX z | | | | |

FIG. 5

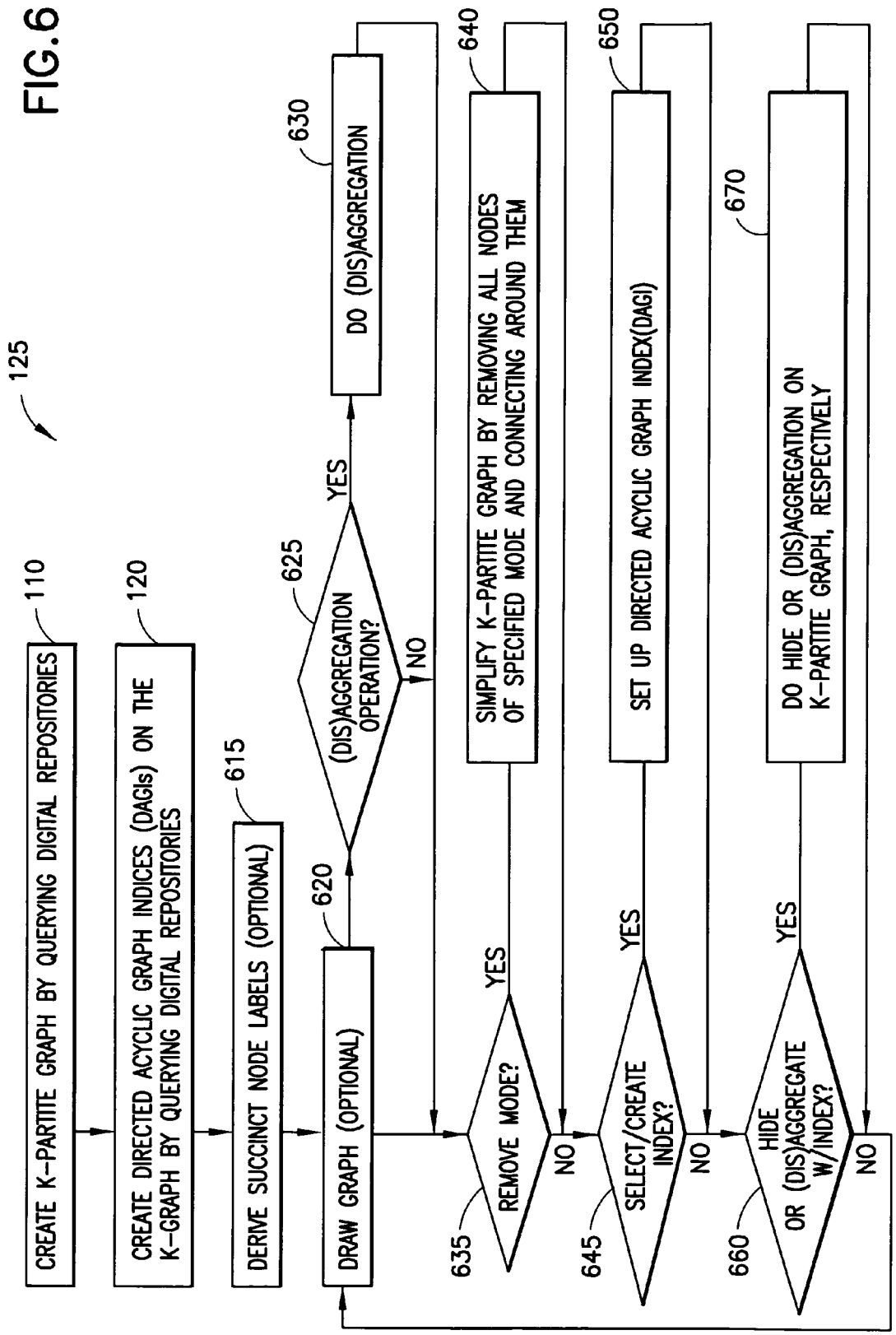

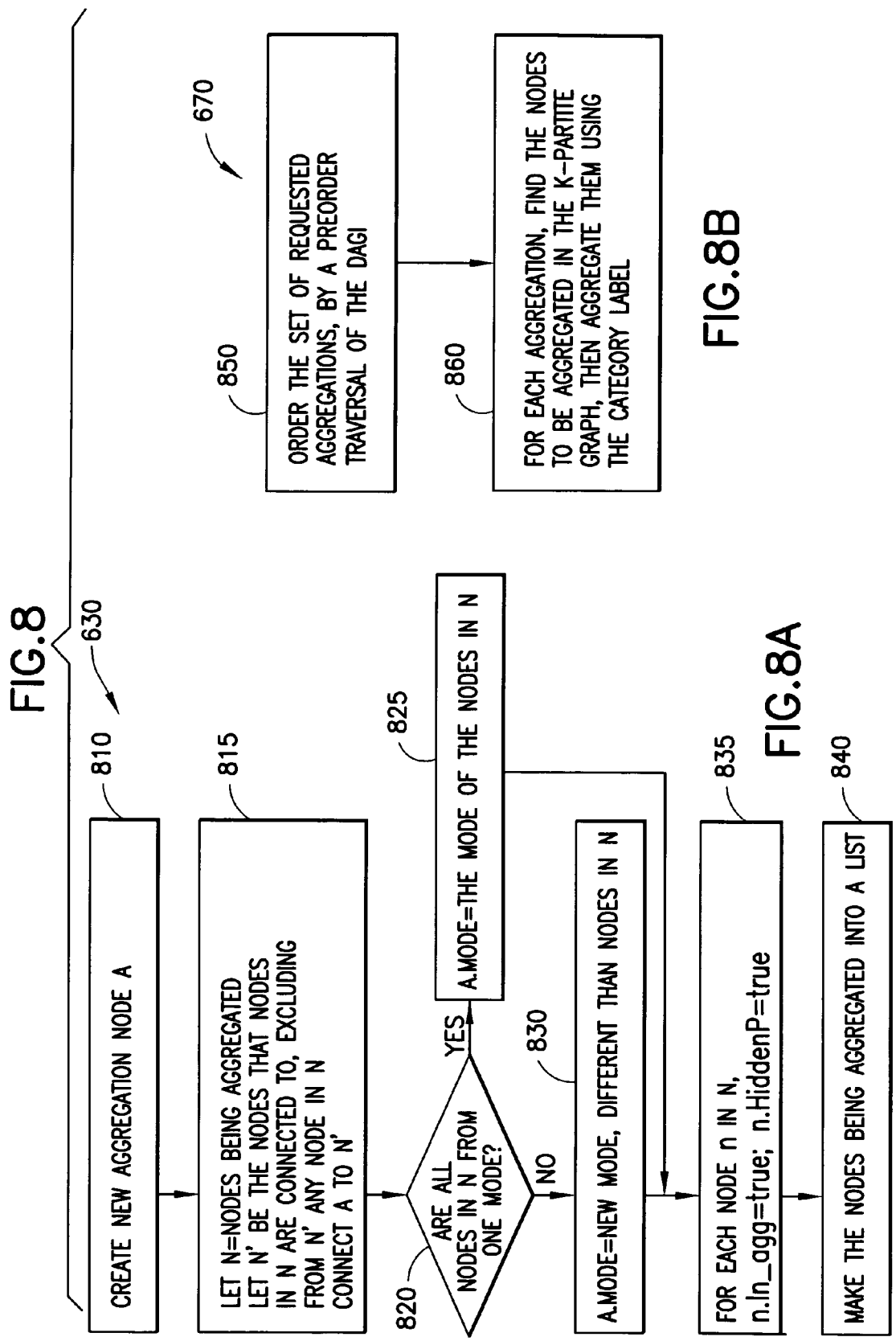

SYSTEM AND METHOD FOR SIMPLIFYING AND MANIPULATING K-PARTITE GRAPHS

CROSS-REFERENCE TO RELATED APPLICATIONS

This application is a National Stage Application of International Application No. PCT/US2002/011098, filed Apr. 5, 2002, which claims the benefit of U.S. Provisional Application No. 60/283,013, filed Apr. 11, 2001.

FIELD OF THE INVENTION

This invention relates to the field of information retrieval and analysis. More specifically, the invention relates to visualization of retrieved and/or analyzed information over a network.

BACKGROUND OF THE INVENTION

Graphs provide a powerful formalism and visual representation for modeling objects and their relationships. Informally, a graph is simply a collection of vertices or nodes, pairs of which are connected by edges. More formally, a graph is a set of vertices with an adjacency relation between vertices. The edges may be undirected (i.e., symmetric) or directed (i.e., asymmetric). In addition, weights may be attached to the nodes, in which case the graph is called a network.

One type of graph is a k-partite graph. The definition of a k-partite graph is a graph whose vertices can be partitioned into k disjoint sets so that no two vertices within the same set are adjacent. See Deo, N., 1974, entitled *Graph theory with applications to engineering and computer science*, P. 168-169, Prentice-Hall, Inc: Englewood Cliffs, N. J. A special case occurs when k=2; this type of graph is called a bipartite graph. In a bipartite graph there are two sets and each node is a member of one set. Further, all of its connections are to nodes in the other set. Bipartite nodes are important in social network analysis where they are called two mode networks, affiliation networks, or actor networks See Borgatti, A. & Everett, M. G., 1997, entitled *Network analysis of* 2-*mode data, available* online at http://www.analytictech.com/borgatti/2mode.htm. Commonly an affiliation network is used to see the relationships between a group of people via a set of events in which they participate. When modeling or graphing these relationships one set of nodes or mode, is the people. The other set of nodes or mode is the events. Whenever a person participates in an event there is an edge connecting the two. The affiliation networks express the social relationships of the people involved, so that using them properties can be derived about the people and the events. For example, which event attended by the most people, which person went to the most events, and which people and events are most central, i.e., do the best job of tying together the group.

A key problem in analyzing social networks is acquiring and storing the data. Often this data is accumulated manually by having people fill out surveys summarizing their participation in events then these data are tabulated. Alternatively, traces of people's social behavior can be gleaned from computer records. For example, a system called Netscan referenced in Xiong, R., Smith, M. A., and Drucker, S. dated October 1998, entitled Visualizations of Collaborative Information for End-Users, *Microsoft Technical Report No. MST-TR*-98-52, also online at: research.microsoft.com/~sdrucker/papers/collabvizchi99.doc) automatically scans Usenet archives and associates authors with the messages they post. This graph is a 2-mode or bipartite since the nodes can be divided into two sets, further, a node in one set only connects to nodes in the other set. These graphs are visualized to help Usenet users trace through connections between authors and their postings.

The field of graph visualization, a subfield of information visualization, seeks to provide techniques and systems to aid in the inspection, navigation, and analysis of graphs. This includes the question of how to layout the graph so people can see the relationships between nodes and providing interfaces to allow these relationships to be dynamically manipulated. A general goal of viewing and interacting with graphs is providing the ability to focus in on regions of interest, while providing sufficient context or background to aid in the interpretation of the foreground or focal information. A good survey of graph visualization techniques divides its review into 1) Graph layout methods: Deciding where to place the nodes and links; 2) Navigation and interaction: How the user moves around the graph and manipulates it; and 3) Clustering: Simplifying the graph by grouping or aggregating nodes. See Herman, I., Melancon, G., & Marshall, M., 2000, entitled Graph visualization and navigation in information visualization: a survey in IEEE Transactions on Visualization and Computer Graphics 6(1), 24-43.).

An important operation to simplify graphs that is provided by many systems is filtering. Filtering graphs mean removing nodes according to set criteria. For example, dynamic controls can be provided that select which nodes should be retained. See Becker, R. A., Eick, S. G., & Wilks, A. R., 1995, entitled Visualizing network data. *IEEE Transactions on Visualization and Computer Graphics*. 1(1). 16-28).

Other powerful simplification operators use hierarchies, either implicit in the graph (intrinsic or structural) or defined elsewhere (extrinsic). These hierarchies can simplify graphs directly (e.g., only presenting the remaining hierarchy) or by providing assistance in analyzing the graph. A strict hierarchy or tree is defined as a directed graph where every node has exactly one parent or one node that points to it. A more flexible hierarchy is a directed acyclic graph where nodes many have more than one parent, but no cycles or loops exist in the graph. One system that explored the use of hierarchies for graph visualization extensively provides facilities for (1) aggregating the graph into its bi-connected components, (2) viewing a spanning tree of the graph via TreeMaps (a space-filling version of a tree), and (3) extracting a subset of the hierarchies to show a focal node and its nearby relatives in order to provide a sense of context for the node that explains how it fits into the overall graph. See Rivlin, E., Botafogo, R. & Shneiderman, B. Navigating in hyperspace: Designing a structure-based toolbox. *Communications of the ACM*, 37:87-96, 1994.

A common graph visualization problem is how to label nodes in the graph. This problem is especially important when the nodes in a graph represent lengthy text objects such as word processing documents or web pages. Solving this problem is similar to finding a brief summary for a document. There are many well-known algorithms for extracting salient text units from a document collection. One approach assumes that text units with a uniform distribution over the collection of documents are not salient and should be filtered out. Another approach is to see if the frequency of a text unit in the text is high relative to its frequency in a corpus of background text. See Moens, M. F., 2000, entitled *Automatic Indexing and Abstracting of Document Texts*. P. 89-97. Kluwer Academic Publishers:Boston, Mass. In this technique each term, made up of one or more consecutive words, is assigned a tf*idf weight, which stands for term frequency times inverse document frequency.

These references are herein incorporated by reference in their entirety.

Problems with the Prior Art

The creation of k-partite graphs that describe the relationships between objects, such as digital documents and people, is not well automated. Data to create these graphs is often acquired through survey or interviews. These techniques are time-consuming and prone to error since subjects' self-report can differ from their actual practice. Further, they are difficult to update since notification that a change has occurred is often not made and finding out what changes requires redoing the expensive interviewing or survey processes.

The simplification of k-partite graphs is difficult, relying either on complex querying systems that require the use of programming or elaborate specification, or is done manually. In the former case, there are systems that can simplify graphs based on their structure, but substantial skill and training is needed to perform these operations such as the ability to program in a graph-oriented language. In the later case, the simplifications are exceptionally time-consuming and laborious requiring selecting the nodes by hand or using analysis techniques that are defined in terms of general graphs, rather than k-partite graphs.

Further, despite the availability of external directories of people and other extrinsic indices on the nodes, there are no straightforward tools for simplifying k-partite graphs using these indices. Finally, there are no straightforward tools for simplifying k-partite graphs that represent social networks, including both people and their computational artifacts, such as documents, using social network analyses.

In general, current systems fail to take account of the benefits of analyses based on the social networks that have accounted for the creation, use, modification, or other history of digital objects. For example, systems fail to characterize and label objects by analyzing relationships between their authors based on the authors relationships to other objects such as documents written.

The viewing and manipulation of large k-partitite graphs is not well supported in current graphical user interfaces for information visualization. In particular, systems fail to provide sufficient controls for maintaining focus on a subset of the graph. Further, systems fail to allow focusing on one set of objects while relegating other objects to background status by, for example, suitably aggregating them, while still preserving relationships across the modes for the focused objects.

Systems that create nodes in graphs corresponding to documents or other objects in digital repositories fail to derive short and useful labels for these nodes. The unavailability of short and useful labels makes it difficult to get the "big picture" of the digital objects and their relationships in the graph when these objects are viewed in a graphical user interface.

OBJECTS OF THE INVENTION

An object of this invention is an improved system and for information retrieval and processing.

An object of this invention is an improved system for information retrieval and processing that represents the relationships between digital objects as a k-partite graph.

An object of this invention is an improved system and for information retrieval and processing that represents the relationships between digital objects as a k-partite graph and directed acyclic graph indices on those objects.

An object of this invention is an improved system and for information retrieval and processing that represents the relationships between digital objects as a k-partite graph and directed acyclic graph indices (DAGI) on those objects, where the DAGI provides select, hide, aggregate, and categorize operations on the k-partite graph.

An object of this invention is an improved system and for information retrieval and processing that represents the relationships between digital objects as a k-partite graph and directed acyclic graph indices (DAGI) on those objects where the k-partite graph is shown as a tree control. An object of this invention is an improved system and for information retrieval and processing with automatic aggregation.

An object of this invention is an improved system and for information retrieval and processing by providing short title descriptions for nodes that have text descriptions associated with.

SUMMARY OF THE INVENTION

The present invention is a system and method for information processing. The system has a collection of a plurality of objects. Each object defines a node in a k-partite graph, such that, each node is a member of a set the k-partite graph having at least two nodes. Each node is in exactly one set. The nodes are connected by edges such that no node is connected to another node in the same set. The system also has a simplification process that aggregates one or more of the nodes into one or more categories and identifies a category node corresponding to each category. The category node inherits the mode and the edges of all the nodes in the respective category.

In a preferred embodiment, the system also contains Directed Acyclic Graphs Indices (DAGIs) whose nodes may have a 1-1 mapping with the nodes in the k-partite graph. These indices can be used to aggregate and hide nodes in the k-partite graph according to its structure and using the 1-1 mapping.

BRIEF DESCRIPTION OF THE FIGURES

The foregoing and other objects, aspects, and advantages will be better understood from the following non limiting detailed description of preferred embodiments of the invention with reference to the drawings that include the following:

FIG. 3 is a data structure that defines a preferred k-partite graph.

FIG. 4, includes FIGS. 4A and 4B, where FIG. 4A is a data structure that defines a preferred directed acyclic graph index (DAGI), and FIG. 4B is a data structure that defines a preferred DAGI tree.

FIG. 5 is a data structure that defines a non-limiting example of a k-partite graph linked to multiple DAGIs.

FIG. 6 is a flowchart that provides a high level overview of the process of analyzing a k-partite graph including one preferred embodiment using a DAGI.

FIG. 8 includes FIGS. 8A and 8B, where FIG. 8A is a flowchart describing the process of aggregation within a k-partite graph, and FIG. 8B is a flowchart describing the process of aggregation within a k-partite graph and directed via a DAGI.

DETAILED DESCRIPTION OF THE INVENTION

Figure 1B:
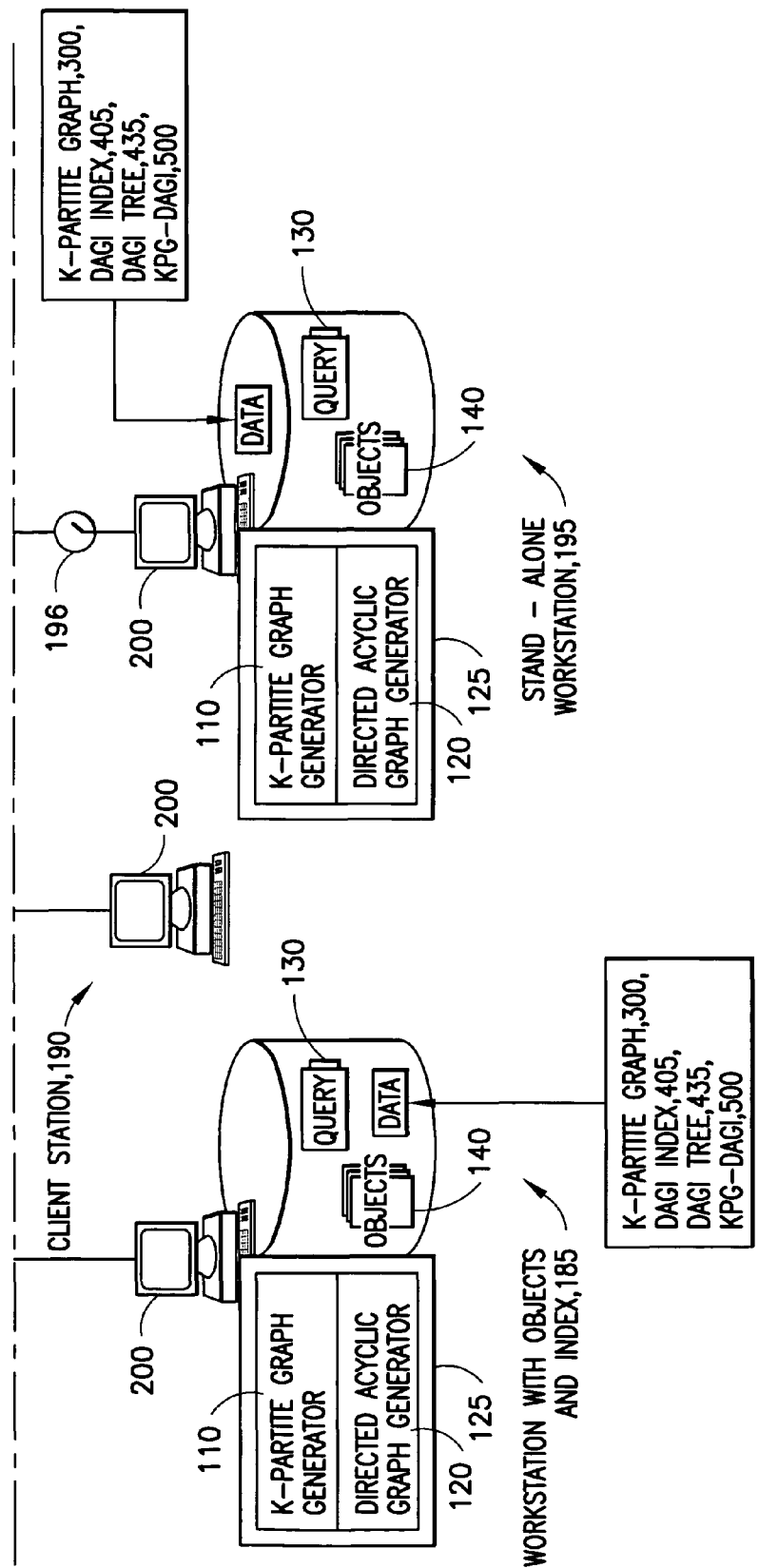
FIG. 1 is a block diagram on one preferred embodiment of the present invention.

FIG. 1 is a block diagram of the computing environment in which the present invention is used in a non limiting preferred embodiment. The figure shows some of the possible hardware, software, and networking configurations that make up the computing environment. The computing environment or system 100 comprises one or more general purpose computers 170, 175, 180, 185, 190, and 195 interconnected by a network 105. Examples of general purpose computers include the IBM Aptiva personal computer, the IBM RISC System/6000 workstation, and the IBM parallel SP2. (These are Trademarks of the IBM Corporation.) The network 105 may be a local area network (LAN), a wide area network (WAN), or the Internet. Moreover, the computers in this environment may support the Web information exchange protocol (HTTP) and be part of a local Web or the World Wide Web (WWW. Some computers (e.g., 195) may occasionally or always be disconnected 196 from the network and operate as stand-alone computers.

Data objects 140 are any digital objects such as books, articles, reports, patents, web pages, recordings, relational data bases, object-oriented data bases, file systems, directories that contain text, images, video, audio, digital data, or any other multimedia object and/or information and/or components thereof One or more data objects are stored on one or more computers in the environment.

To find a particular data object in the environment, a query is submitted for processing to a query processor 130 running on a computer in the environment. Query processors 130 are processes such as topical search engines, data base query processors, directory search protocols, and any sort of interface that allows the specification of search criteria as an input and responds with digital data where that data is either the requested data itself or pointers to network locations where the data can be obtained. The data objects collection 141 obtained via the query processor may be in the form of a hit-list, database relation, or other type of data aggregate. A data object collection 141 may comprise data objects located anywhere in the computing environment, e.g., spread across two or more computers. The process is well known in the prior art. Examples of query processors 130 include Search Manager/2 (a trademark of the IBM corporation) and DB2 (a trademark of IBM corporation).

The result of the search is then analyzed by the k-partite graph generator 110 to identify the desired objects and their relationships. Based on this analysis additional queries may be made and additional data objects requested, retrieved, and analyzed. Based on inferred structural relationships in the data returned the k-partite graph generator 110 creates a k-partite graph that represents the objects and the relationships between them. For example, a document base is queried and a bi-partite graph of documents and their authors is created, where there is a node for each document and each author, and edges between documents and authors to indicate authorship. In the preferred embodiment there are three sorts of queries that can be made to such a document base. First, a set of authors can be specified in order to retrieve a graph of those authors, the documents they authored, and all co-authors. Second, a single author can be specified and a crawl level which is an integer greater than 1 specifying how many degrees of separation to extend the query. This retrieves a graph containing the author, her documents, the co-authors, the co-authors' documents, the co-authors of the co-authors' documents, and so on to the degree of indirection given by the crawl level. Third, a keyword query can be given that retrieves a graph containing documents that reference those keywords and the authors of those documents.

An important issue in forming the k-partite graph from the results of successive queries is to decide when two results refer to a single instance. For example, suppose a document is authored by "John Black" and another by "John D. Black". The k-partite graph creation must decide if these both refer to the same individual, thus allocating a single node to cover both, or whether these are two different individuals, thus meriting two different nodes. In the preferred embodiment heuristics so that two names are held to refer to the same individual if both are known to be affiliated with the same organization and the only difference is that one has a fully specified middle name and the other has only a middle initial where the middle initial and the first letter of the fully specified name are the same. This is an issue beyond names and must be settled for all the various modes of the k-partite graph.

There the various fields and their purposes are discussed. The creation of the k-partite graph in terms of nodes pointing to other nodes via edges relies largely on the prior art in that the method of connecting nodes in a k-partite graph can use the same techniques used for general graphs. See Deo, N., 1974, entitled *Graph theory with applications to engineering and computer science*, P. 270-273, Prentice-Hall, Inc: Englewood Cliffs, N. J. However, the k-partite graph does require additional fields for its correct manipulation. The fields are included in FIG. 3 300 that defines a preferred embodiment for the k-partite data structure. The use and manipulation of these fields in discussed below reference to FIG. 3 300. This data structure is also referenced in FIG. 1 300 in order to show that the k-partite graph generator creates, initializes, and manipulates the k-partite graph data structures 300. The Directed Acyclic Graph Index Generator 120 assembles indices on the nodes in the k-partite graph. The structure of these indices and additional nodes within them are found by making additional queries to the query processors 130. Continuing the example above, a query might be issued on each of the authors identified above, in order to place them into an organizational hierarchy. The resulting organizational hierarchy would serve as a Directed Acyclic Graph Index (DAGI) on the k-partite graph. The DAGI Generator stores the DAGIs into DAGI data structures as described in FIG. 4 400. In addition, the DAGI generator process 120 is described below as FIG. 7. For convenience, the k-partite graph generator 110 and DAGI generator 120 are shown here as separate components. Note, however, that both systems may be components of the k-partite graph with DAGIs (KPG-DAGI) process 125 that is defined through the KPG-DAGI data structure which is shown in FIG. 5 500 and described further below. The KPG-DAGI data structure is comprised of a k-partite graph 300 with one or more DAGIs, as described in FIG. 4 400, where the DAGI nodes may be in 1-1 correspondence with the k-partite nodes, thus allowing the DAGI to act as an index on the k-partite graph nodes. The Requirement that the nodes of the k-partite graph and DAGI be in correspondence does not mandate that they be part of a single computing process, nor that they reside on the same processing element, as is discussed below. The KPG-DAGI process 125 provides the means to manipulate and analyze the k-partite graph by performing aggregations, hiding k-partite graph nodes. These functions may be performed interactively via a Graphical User Interface 200. See FIG. 7 (120) below for more detail.

Data objects 140 on one computer may be accessed over the network by another computer using the Web (http) protocol, a networked file system protocol (e.g., NFS, AFS), or some other protocol. Services on one computer (e.g., query processors 120) may be invoked over the network by another computer using the Web protocol, a remote procedure call (RPC) protocol, or some other protocol.

A number of possible configurations for accessing data objects, indexes, and services locally or remotely are depicted in the present figure. These possibilities are described further below. One configuration is a stand-alone workstation 195 that may or may not be connected to a network 105. The stand-alone system 195 has data objects 140 and a query processor 130 located locally. The stand-alone system 195 also has a k-partite with DAGI system 125 installed locally.

When the system is used, a query is input to the workstation 195 and the results processed by the k-partite graph generator 110 and DAGI generator 120 using query processor 130.

A second configuration is 185, a workstation with data objects, query processor, and analysis connected to a network 105. This configuration is similar to the stand-alone workstation 195, except that 185 is always connected to the network 105. Also, the local query processor 130 may query local data objects 140 and/or remote data objects accessed via the network 105, and utilize either a remote k-partite graph generator 110 and a local DAGI Generator 120 or a remote k-partite graph generator 110 and a remote DAGI Generator 120 accessed via the network 105. When queries are input at the workstation 185, they may be processed locally at 185 using the local k-partite graph generator 110, local DAGI Generator 120, and local query processor 130. Alternatively, the local k-partite graph generator 110 and DAGI Generator 120 may access a remote query processor 130 (e.g. on system 175) via the network 105. Alternatively, the workstation 185 may access a remote k-partite graph generator 110 and DAGI Generator 120 via the network 105.

Another possible configuration is 175, a workstation with a query processor 130 only. Computer 175 is similar to computer 185 with the exception that there are no local data objects 140. The local query processor 130 accesses data objects 140 via the network 105. Otherwise, as in computer 185, the query processor 130, k-partite graph generator 110, and DAGI Generator 120 may be accessed locally or remotely via the network 105 when processing queries. Another possible configuration is computer 180, a workstation with data objects only. The data objects 140 stored locally at computer 180 may be accessed by remote k-partite graph generator 110 and DAGI Generator 120 via the network 105. When queries are entered at computer 180, k-partite graph generator 110, DAGI Generator 120, and query processor 130 must all be accessed remotely via the network 105.

Another possible configuration is computer 190, a client station with no local data objects 140, query processor 130, k-partite graph generator 110, or DAGI Generator 120. When queries are entered at computer 190, k-partite graph generator 110, DAGI Generator 120, and query processor 130 must all be accessed remotely via the network 105.

Another possible configuration is computer 170, a typical web server. Queries are entered at another workstation (e.g., 175, 180, 185, or possibly 195) or a client station (e.g., 190) and sent for processing to the web server 170 via the network 105. The web server 170 uses a remote k-partite graph generator 110, DAGI Generator 120 and query processor 130 (accessed via the network 105) to process the query. Alternatively, one or more of these functions (110, 120, and 130) can reside on the web server 170. The results are returned to the workstation or client station from which the query was originally sent.

Figures 2, 2A:
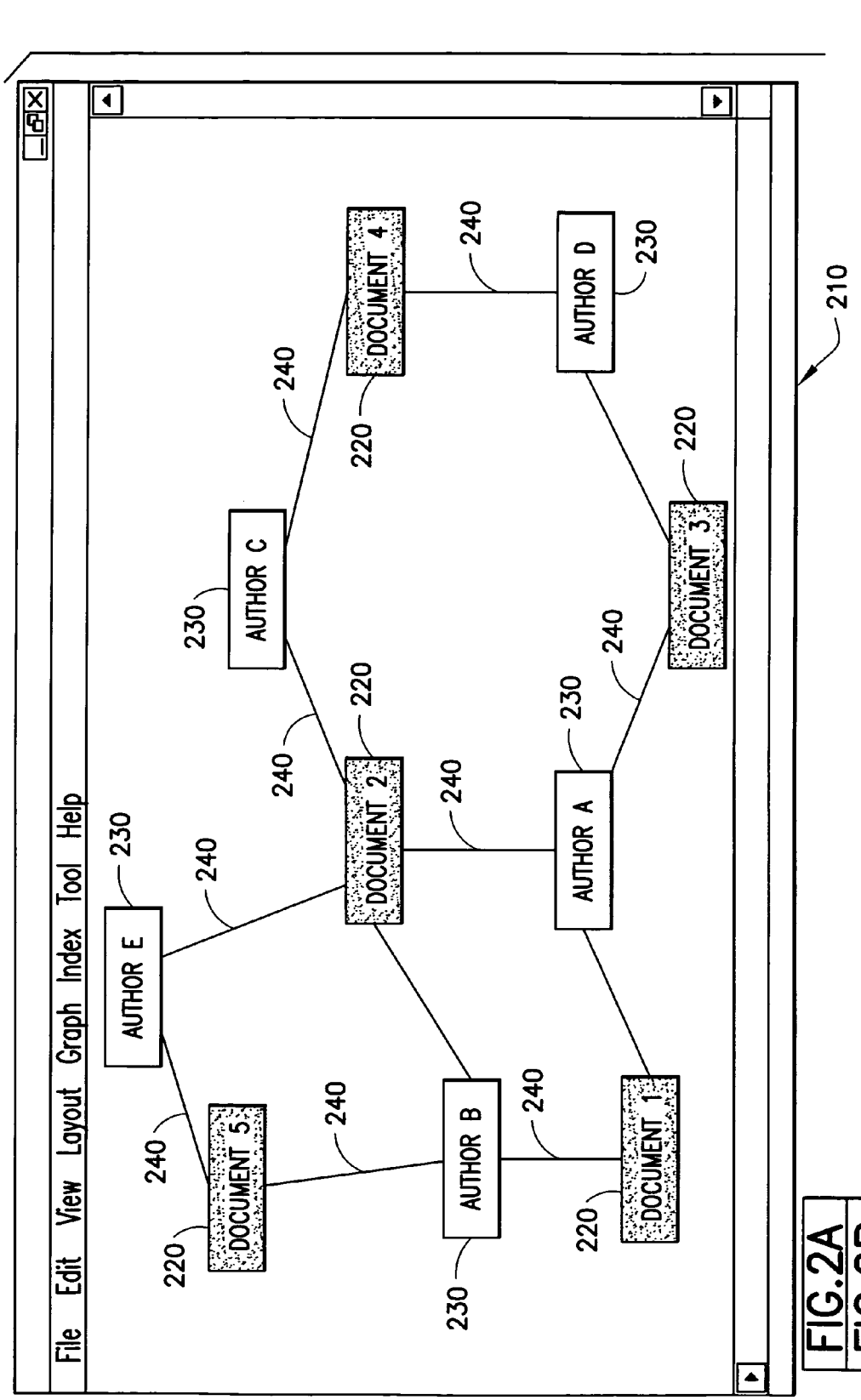
FIG. 2 is a series of screen shots showing the graphical user interface and key functionalities via the preferred embodiment.
Figure 2B:
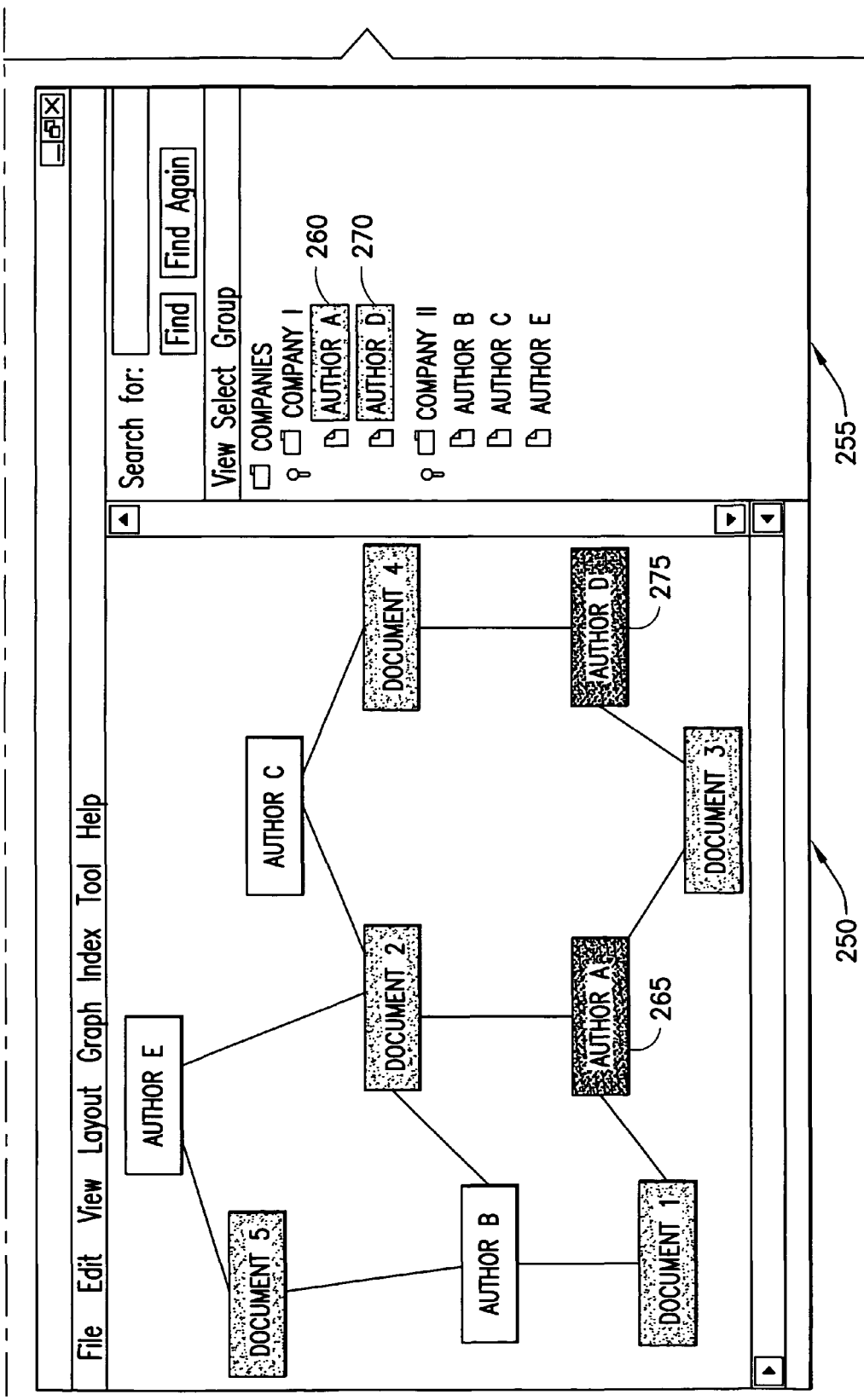
Figure 2C:
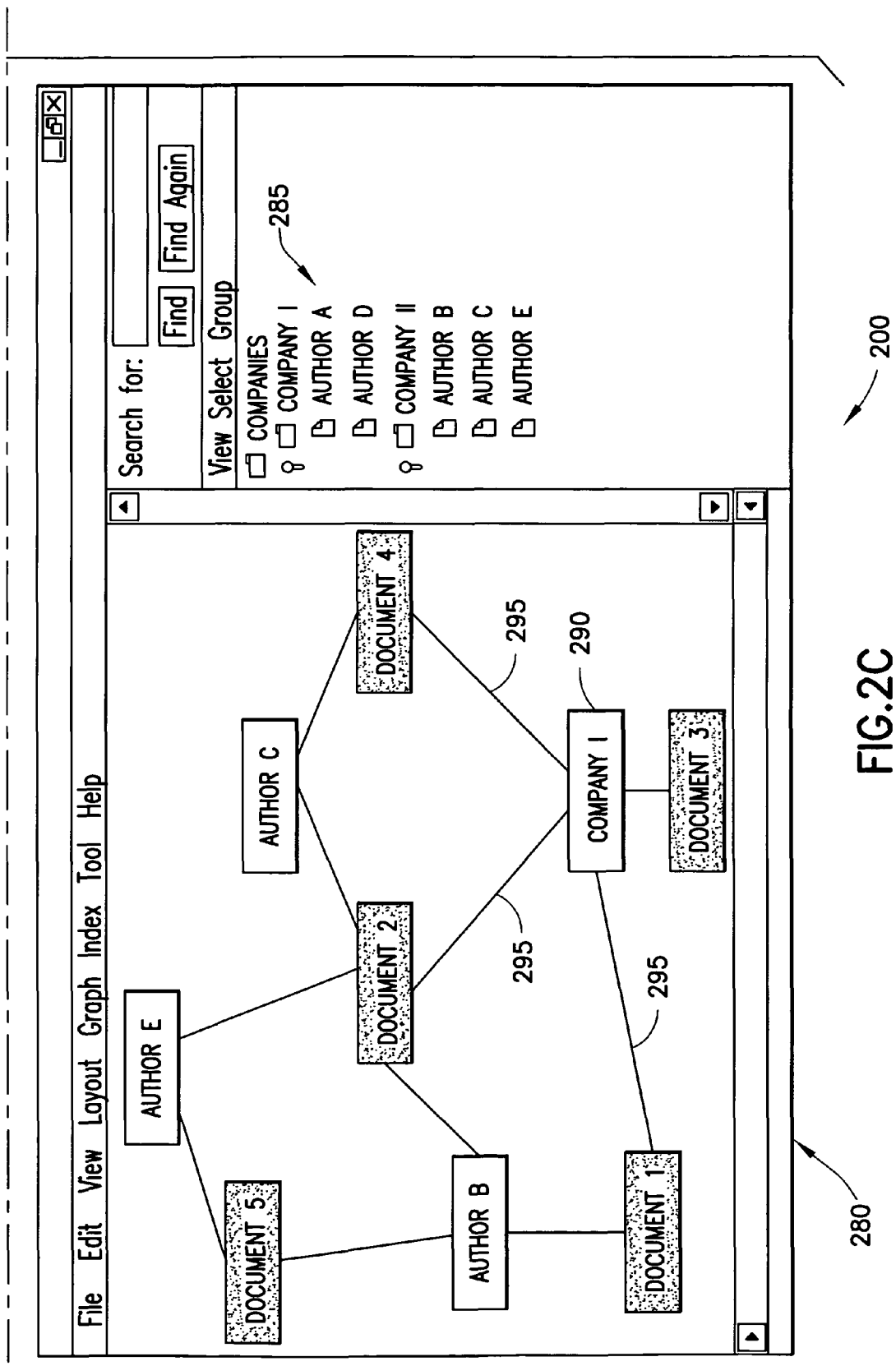

FIG. 2 is a series of screen shots showings the graphical user interface and key functionalities via the preferred embodiment 200. The first screen shot 210 shows a bipartite graph (i.e., a k-partite graph where k=2) where one mode is authors and the other mode is documents. Hence, all of the nodes are either author nodes 220 or they are document nodes 230. Further, all of the edges 240 are between author nodes 220 and document nodes 230, so that none of them interconnect author nodes 220 or document nodes 230. Note that the author nodes 220 are distinctively shaped and shaded relative to the document nodes 230.

Important functions provided by the preferred embodiment of the Graphical User Interface 200 include laying out the graph so it has an aesthetic appearance; providing interactive controls for selecting nodes, dragging nodes, hiding nodes, aggregating nodes; and display options for whether to display node labels, display arcs, zoom in and out, centering, etc.

In the preferred embodiment the graph layout is done through a prior art method that uses multidimensional scaling (MDS) to provide an aesthetic layout of the graph by basing the layout on the graph's internal structure. The structure is characterized for each pair of nodes by their "graph distance" or the shortest path between every pair of nodes. Further, their visual relationship is calculated via their "Euclidean distance" or the distance on the screen between the nodes. A "stress" score is then computed by the difference of the two. An overall stress value is computed for each node by summing its relations to all of the other nodes. This stress is used to calculate the movement of each node by moving each node a fraction of its stress multiplied by a constant. This basic algorithm is elaborated by not considering all of the nodes from the beginning. Rather only log N of the nodes are arranged, where N is the number of the nodes. After each series of iterations, double the number of nodes are arranged as the last time, where the new nodes are heuristically placed based on the position of the two nodes with the shortest graph distance. For the prior art description, see Cohen, J. D. (September, 1997). Drawing graphs to convey proximity: an incremental arrangement method. *ACM Trans. Comput.-Hum. Interact.* 4, 3, pp. 197-229. Following the MDS layout an additional post-processing step is needed to ensure that the nodes do not overlap. This is done by a sweep line algorithm that sweeps from left to right and then from top to bottom, moving nodes that overlap to the right or downward, respectively.

In the second screen shot 250 the DAGI appears 255. The DAGI appears as a tree control, even though it represents a directed acyclic graph. This is accomplished by representing the directed acyclic graph that defines the DAGI using a tree. The difference between the trees and directed acyclic graphs is that all nodes in a tree have at most one parent (the root does not have any parents). Directed acyclic graphs can be represented as a tree by replicating portions. So, if a node A has two parents B and C, a second copy of A is created, A', so that B points to A and C points to A'. However, the replicated nodes still refer to the same k-partite graph nodes. So, if A referred to k-partite graph node D, the replicated node A' also points to D. This allows the tree control to manifest the correct behavior. In the screen shot 250 the tree control representing the DAGI 255 has two nodes selected, Author A 260 and Author B 270. This causes the k-partite graph nodes referred to them to also be highlighted. These k-partite graph nodes are Author A 265 and Author B 275. In the third screen shot 280 the effect of an aggregation is shown. The aggregation has been accomplished using the tree control implementing the DAGI so that Corporation 1 285 is a new category node and appears in the k-partite graph as a Corporation 1 290. The new category node Corporation 1 290 inherits the mode of the nodes it aggregates, hence it is considered an author node as well, thus is shaped and shaded as an author node. Further, the new category node Corporation 1 290 has a series of edges 295 that connect it to the same nodes to which Author A 265 and Author B 275 were connected.

In subsequent figures, a number of data-structures are described as tables. This is for convenience of drawing and description. In an actual implementation, any usual data-structure such as a normal array, an associative array, a linked list, a hash table, or any other structure may equivalently be used without affecting the invention described herein.

The table in FIG. 3 is one preferred set of data structures used to implement the present invention. In FIG. 3 the data structure 300 represents a k-partite graph 300 as a linked list nodes. Each node has a name 310 that specifies both a system identifier and a printable label. The printable label is displayed by the Graphical User Interface 200 and is computed by the labeling process 615. A DAGI node refers to a k-partite graph node through this name 310. Each node is connected to other nodes by edges. The edges 320 comprise a linked list where each edge 320 in the list specifies a destination node and the next edge 320 in the linked list. For flexibility the edges 320 are doubly linked so each edge 320 also points to the preceding edge 320. The nodes in a k-partite graph are partitioned into sets so that each node is a member of exactly one set and no node points to any other nodes that is a member of its same set. Each set of a k-partite graph is also referred to as a mode 330. This is convenient because the varying sets or modes often have some semantics such as the set of authors or the set of documents. The node's mode 330 is represented as a string.

In a preferred embodiment, nodes can be hidden or visible. The hiddenP field 340 records whether or not a node is hidden. If the value is true then the node is hidden, else it is visible. Similarly, a node may be selected. The selectedP field 350 records this state. If the value is true then the node is selected. A node may be part of an aggregation. This is important to know since this influences how the node is further processed. For example, if it is part of an aggregation it should not be placed into another aggregation as each node can be part of only one aggregation. The inaggP field 360 records this state. If the value is true then the node is part of an aggregation. The list of nodes that are aggregated needs to be stored so that when a disaggregation occurs they can be properly updated. The inaggnext field 370 serves this purpose by providing a way to form a linked list of nodes all of which participate in the same aggregation. It is important to know whether a node is defined via an aggregation, further if a node is part of an aggregation the nodes it has aggregated need to be stored. The aggP field 380 serves these functions. If the value is null then the node is not part of an aggregation. If it is not null then it points to a node that it is aggregating, further, that node points to the rest of the nodes involved in the aggregation via the inaggnext field 370. The complete set of nodes involved in the k-partite graph is stored via a linked list. This allows the k-partite graph to be represented as a single node that links the other nodes in the graph. This linked list is maintained through the next field 390.

FIG. 4, comprising FIGS. 4A and 4B, is one preferred set of data structures used to implement the present invention.

In FIG. 4A the data structure 405 represents a DAGI. The DAGI is made up of a linked list of nodes much like the k-partite graph 300. Beyond being a linked list of nodes where each node has a name 410, each DAGI node or dnode 420 refers to a k-partite node or knode 430, thus a 1-1 relationship may be established that is used for DAGI operations including selection, aggregation, and hiding.

In FIG. 4B the data structure 435 represents a DAGI Tree, that is, a DAGI that is represented as a tree. When a tree is used to represent a DAGI some DAGI nodes could be replicated. Thus, in this embodiment, the relation of DAGI nodes to DAGI tree nodes is 1-many. The DAGI tree node 435 includes a name 440 a dnode 450 which establishes the connection to the k-partite graph via the DAGI 405 and a DAGI tree node or tnode 460. In addition, there is a next field 470 that connects all of the DAGI tree nodes corresponding to a given DAGI node in a circular list. This allows a mapping from a DAGI tree node to all of the other DAGI tree nodes that correspond to the same DAGI node.

The table in FIG. 5 is one preferred set of data structure used to implement the present invention. In FIG. 5 the data structure 500 represents a k-partite graph with associated DAGIs (KPG-DAGI). The KPG-DAGI data structure 500 includes a k-partite graph as described in FIG. 3 300 and one or more DAGIs as described in FIG. 4 400. The KPG-DAGI data structure records a name 510, its k-partite graph 520 and zero or more DAGIs through the DAGI field 530 and nextindex field 550. When at least one DAGI is present it is stored in the DAGI field 530. The inferredP field 540 records whether the DAGI was inferred from the structure of the k-partite graph (i.e., intrinsic) or was it obtained from some external source (i.e., extrinsic). This distinction may be important because intrinsic DAGIs are recalculated whenever they are needed based on the current configuration of the k-partite graph (i.e., what nodes are visible and what aggregate nodes exist) whereas extrinsic DAGIs are static. If more than one DAGI is associated with the KPG-DAGI data structure the next DAGI is identified using the nextdagi field 550. More detail on the k-partite graph data structure is found above on FIG. 3 300, while more detail on the DAGI data structure is found above on FIG. 4 400, and detail on the creation of the DAGI data structure is found on FIG. 7 120.

FIG. 6 is a flowchart showing the method steps of one preferred process executed by the present invention. By executing the process in 125 the system 100 enables a k-partite graph to be investigated via a DAGI. The process begins by a query being entered that retrieves a set of digital objects from which a k-partite graph is formed through invoking the k-partite graph generator 110. For example, in the case of searching a document collection a query might ask to find documents by a given set of authors or give a set of keywords to use for a full text search on the documents. From the retrieved documents a k-partite graph is created that links authors with the documents they have authored. (See description of FIGS. 1 and 3, above.)

The next step is to invoke the DAGI generator 120 to DAGIs on various modes of the graph. For example, the documents can be organized into topics. (See description of FIGS. 1, 4, and 5 above and FIG. 7 below.) Since a given document might fit into multiple topics it is not possible to use a simple tree hierarchy, rather a directed acyclic graph is needed.

In step 615 succinct labels are derived for nodes when the nodes are associated with text and a succinct node label is not already available. This allows the nodes to be compactly viewed when the graph is drawn in step 620. Using the graphical user interface 200 users can request that nodes be aggregated. Step 625 tests whether an aggregation request has occurred. If it has then step 630 directs that the aggregation be performed. In step 635 a test occurs whether a request to remove a mode has occurred. If it has, step 640 accomplishes that removal. In step 645 a test occurs whether a request to select or create an index has occurred. If it has, step 650 directs that the index be put into use including creating it, if necessary. The process of creating a DAGI is described in FIG. 7 120. In step 660 a test occurs whether a request to use the DAGI for hiding, aggregation or disaggregation has occurred. If it has, step 670 directs this operation to happen.

Figures 7, 7A:
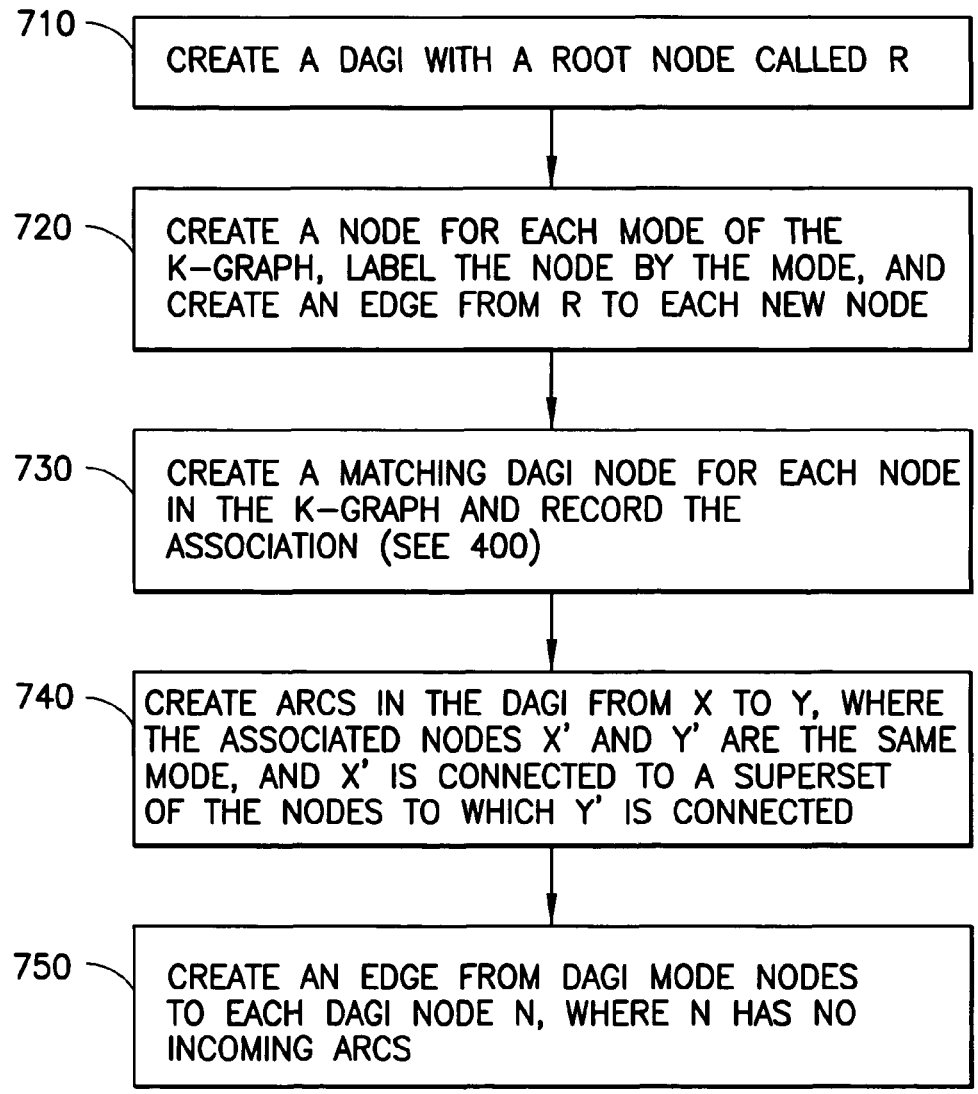
FIG. 7 includes FIGS. 7A and 7B, where
FIG. 7A is a flowchart describing the creation of a DAGI based on a partial order analysis of the k-partite graph.
Figure 7B:
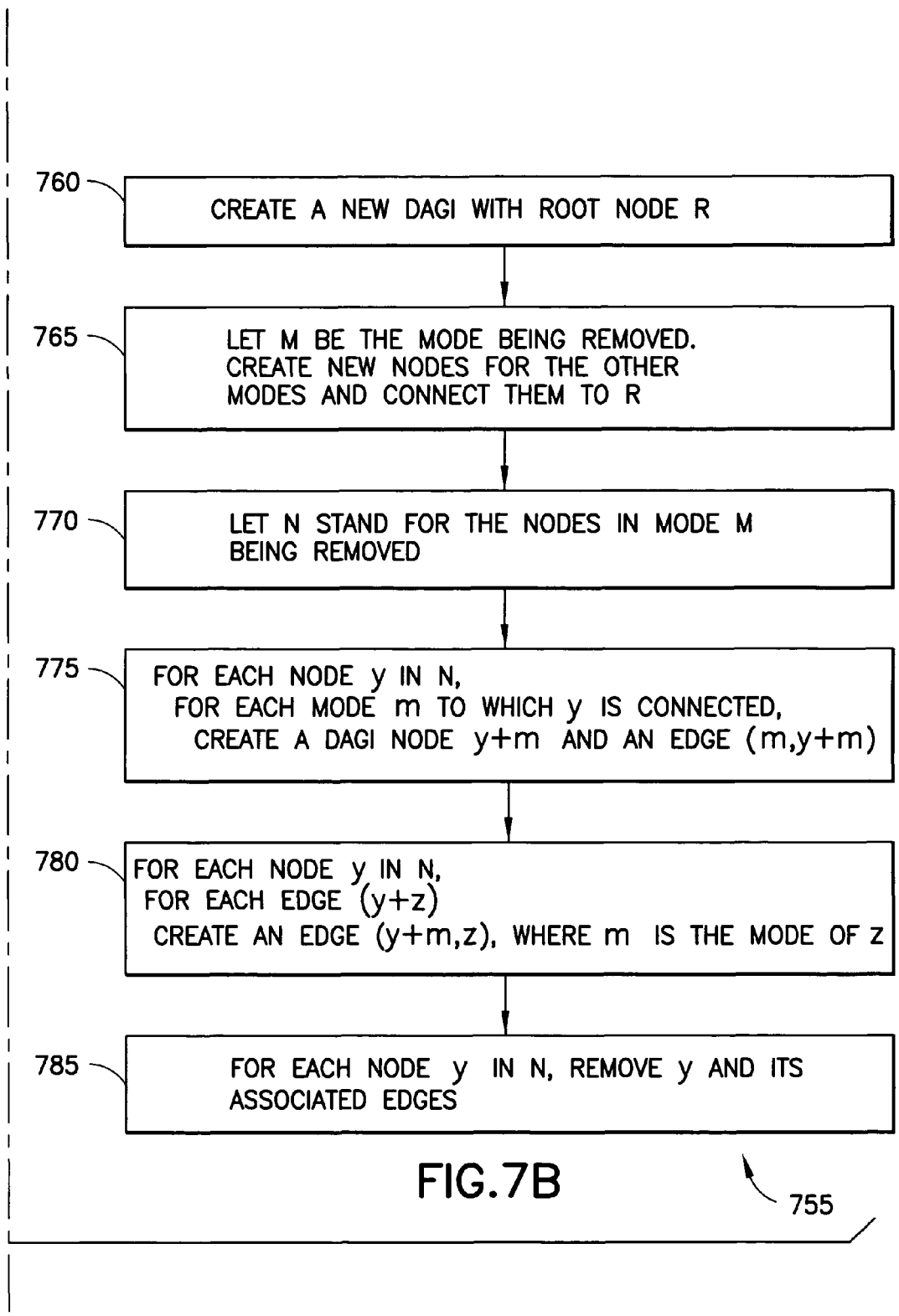
FIG. 7B is a flowchart describing the creation of a DAGI based on removing a mode (i.e., a set of nodes in the k-partite graph) from the k-partite graph.

FIG. 7, comprising FIGS. 7A and 7B, shows flowcharts showing the method steps of two preferred processes executed by the present invention. By executing the processes specified in FIG. 7A or FIG. 7B a DAGI is created. These DAGIs are useful for simplifying and analyzing the k-partite graphs. These processes exemplify the creation of a DAGI which was listed as step 120 in FIGS. 1 and 6. In both FIGS. 7A and 7B the DAGIs being created are intrinsic that is they are based on the structure of the k-partite graph. Other prior art intrinsic traversals of the graph structure, not flowcharted here, divide the nodes into categories, for example, by mode, by degree (i.e., number of nodes to which they are connected), by connected components, by strong components, or by bi-connected components. Other prior art intrinsic traversals of the graph structure, also not flowcharted here, aim to capture more complex aspects of the k-partite graph's structure, for example, giving a breadth-first traversal, giving a depth-first traversal, and reducing the k-partite graph to a directed acyclic graph thus removing only those nodes which result in cycles. These prior art analyses of a graph's structure are described in Deo, N., 1974, entitled *Graph theory with applications to engineering and computer science*, P. 268-327, Prentice-Hall, Inc: Englewood Cliffs, N. J.

The flowchart in FIG. 7A 705 is sufficiently similar and complex to illustrate how to create a DAGIs given that the structure of the k-partite graph has been analyzed as is provided, for example, by prior art for the cases listed above. The process shown in FIG. 7A 705 derives a DAGI based on the implicit partial order of nodes in the k-partite graph. The partial ordering is defined as a relation on the nodes within a given mode based on their connection to other nodes. If two nodes, x and y, are of the same mode, and x is connected to a superset of the nodes of y, then x is above y in the partial order. The order is partial because the ordering relation between x and y may not be defined, that is, x may not be less or greater than y. This occurs if x is connected to a node that y is not connected to and y is connected to a node to which x is not connected. More formally, if next(x) is the set of nodes to which x is connected, and similarly next(y) for y, and the set formed by the expression union(next(x), next(y)) minus intersection(next(x), next(y)) is non-null then x and y are not ordered with respect to one another.

The process in 705 begins by creating a root node for the DAGI in step 710. In step 720 nodes are created for each of the modes and those nodes connected to the DAGI root node. In step 730 DAGI nodes are created corresponding to each k-partite node. The association between the two are recorded using the data structure in FIG. 4 400. In step 740 the partial order for each mode is computed. Pseudo code for accomplishing this operation is as follows. In the psuedo code for DAGI node N, kPartite(N) gives the k-partite graph node corresponding to it, degree(N) gives the number of nodes to which N is connected.

```
1.  Let Queue Q = DAGI Nodes of 730; Let Queue L=null
2.  Sort Q, least to most, based on the degree of their corresponding
    k-partite graph nodes
3.  Unmark all the k-partite graph nodes
4.  While (Q is not empty) {
5.      N = First(Q); Q = Rest(Q)
```

-continued

```
6.      Mark the nodes connected to kPartite(N)
7.      Queue LL=L
8.      Sort LL, most to least, based on the degree of the corresponding
        k-partite graph nodes
9.      While (LL is not empty) {
10.         M = First(LL); LL = Rest(LL)
11.         If all the nodes connected to kPartite(M) are marked {
12.             Create an edge from N to M
13.             Remove from LL all the nodes pointed to by M
14.         }
15.     }
16.     Unmark the nodes connected to kPartite(N)
17.     Add N to L
18. }
19. For all nodes N, such that N does not have an incoming edge, create
    an edge, R to N, where R is the root of the DAGI
```

A few points about how the psuedo code functions. In line 2, the DAGI nodes are sorted from least to most so as to build the partial order from the smallest to the highest. In line 8, the nodes that could be less than N are selected, since only a node with a lower degree can lower in the partial order. When a node is found to be lower an edge is created (line 12) and all nodes found to be lower than it, removed from consideration so redundant edges are not created (line 13). The partial order described here, or lattice as it is called in social network analyses, is useful for finding relationships between people based on their linkages. In particular, the partial order can be used to estimate expertise or segment a group of authors into communities.

A process to remove a mode from the k-partite graph and use the nodes and their relations (as indicated by the nodes' edges) is described in FIG. 7B 755. The first steps of the process are similar to the ones described in FIG. 7A. In step 760 a node R is created to serve as root of the DAGI. In step 770 nodes are created for each of the modes of the k-partite graph, except for the mode M that is being made into a DAGI, and link those nodes to R. Let N stand for the nodes in mode M that are being removed from the k-partite graph and used for the basis of the DAGI. In order to create a DAGI where the leaves of any given interior node are all of the same mode, the nodes N must be divided based on the mode of the nodes to which they are linked via their edges. Accordingly, in step 775 nodes are created that divide each node y in N into multiple nodes such that the number of resulting nodes is equal to the number of different modes to which node y is connected. These new nodes we notate y+m where y is original node and m is one of the modes. In step 780 each node y in N is again considered by examining each of its edges that connect the node y to some node z of mode m. For each such edge a new DAGI node is created to represent z in this context and an edge added from y+m to z. This step completes the creation of the DAGI. In step 785 all nodes of mode M are removed from the k-partite graph, thus completing the transfer of the mode to the DAGI.

An example clarifies the usefulness of the operation of removing a k-partite mode and using it as the basis of a mode as described in flowchart 755. Say a k-partite graph represents a document base with the modes author, organization, and document. Authors are connected to the documents they authored and organizations are connected to authors in which they are members. If the mode of author is turned into a DAGI an index will result that can select, hide, or aggregate authors by the organizations of which they are a part.

FIG. 8, comprising FIGS. 8A and 8B, shows flowcharts showing the method steps of two preferred processes executed by the present invention. By executing the processes specified in FIG. 8 aggregation of nodes is accomplished.

The flowchart in FIG. 8A 630 gives the process for aggregating a set of nodes N in the k-partite graph when they are specified directly, that is, without a DAGI. The flowchart in FIG. 8B 670 gives the process for aggregating nodes through a DAGI.

In FIG. 8A 630 the first step 810 is to create the category node A that will serve as the aggregate. In step 815 the category node A is connected to the graph via a set of edges. The goal is to connect A to the same nodes to which the nodes in N were connected, excluding connections from one nodes in N to another node in N. In step 820 a conditional tests whether all of the nodes in N were of the same mode. If they were, step 825 assigns that mode to A. Otherwise, step 830 assigns to N a new mode. The problem is that when the nodes in N are of different modes it is unclear to which mode should be assigned to A. In step 835 the nodes in N get their flags set indicating they are part of an aggregation and consequently should be hidden. Finally, in step 840 the nodes in N are compiled into a linked list using 390 and the first element assigned to A using 380.

The process in FIG. 8B 670 considers the case where a number of nodes in the DAGI have been selected for aggregation. Only interior nodes (i.e., non-leaf nodes) are eligible for aggregation since leaf nodes have no nodes to aggregate. In step 850 those DAGI nodes selected for aggregation are ordered via a preorder traversal of the DAGI Tree. This ordering is important in order to ensure that nested aggregations take place correctly. Consider the case where P is aggregating Q and R, and Q is aggregating Y and Z. If P is aggregated before Q then the Q aggregation can not occur. The preorder sorting ensures that in this case the Q aggregation would happen before the P aggregation. Essentially a preorder sorting puts the more nested nodes before the less nested ones. In step 860 each of the individual aggregations are accomplished by finding the nodes corresponding to DAGI nodes in the k-Partite graph and then calling the aggregation process 630.

Figure 9:
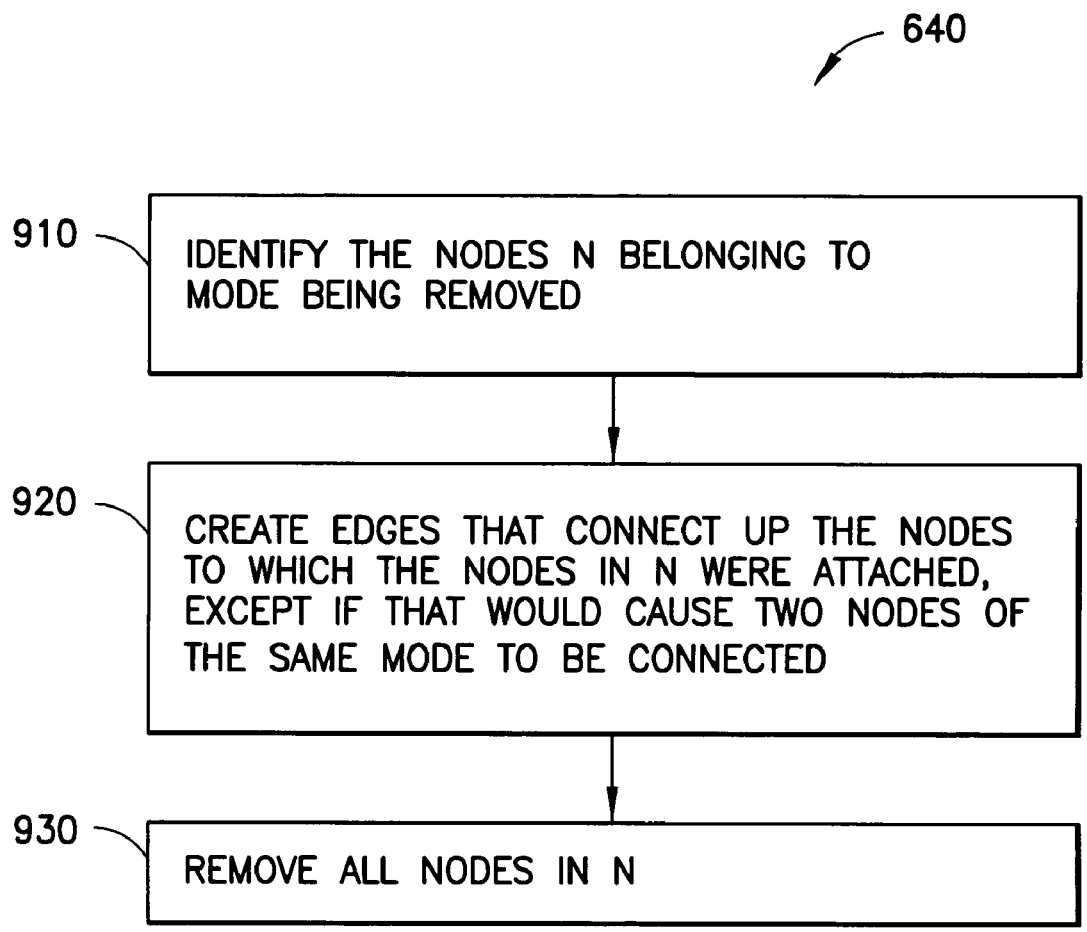
FIG. 9 is a flowchart describing the process of reducing a k-partite graph by removing a mode.

FIG. 9 shows a flowchart showing the method steps of a preferred processes executed by the present invention. By executing the process specified in FIG. 9 640 the k-partite graph has one of its modes removed. A mode is a set of one or more nodes in the k-partite graph such that no node in a given mode is connected to another node in the same mode. In general, a k-partite graph with j modes can be considered simpler than a k-partite graph with j+1 modes, all other things being equal. Hence, removing a mode is a primary way to simplify a k-partite graph. The basic idea is to remove all the nodes of a given mode M, but retain as much of the structural information represented by those nodes as possible by adding new edges that connect together nodes that were indirectly linked by nodes in M. For example, if there is a node of mode M called y and it were connected to a node x and a node z, then when mode M is eliminated x would be connected to z (if it were not already) before N is eliminated. However, this connection can not occur if x and y are part of the same mode. In step 910 the nodes N belonging to the mode M being eliminated are identified. See FIG. 3 above. In step 920 each of the possible new edges, x to z, are raised for consideration and created as long as the result would not be an edge connected two nodes of the same mode. In step 930 all the nodes of mode M are removed. This process is further specified through the following pseudo-code.

1. Given mode M is being removed, identify the Nodes N being removed
2. For each node y in N {
3.     For each edge (x, y) {
4.         For each edge (y, z) {
5.             If mode(x) != mode(z)
6.                 Create an edge (x, z)
7.         }
8.     }
9. }
10. For each node y in N {
11.     Remove y
12. }

The utility of this operation is illustrated using the same example as above. Say a k-partite graph represents a document base with the modes author, organization, and document. Authors are connected to the documents they authored and organizations are connected to authors in which they are members. If the mode of author is removed then organizations will be connected to documents where a member of that organization served as an author.

Figure 10:
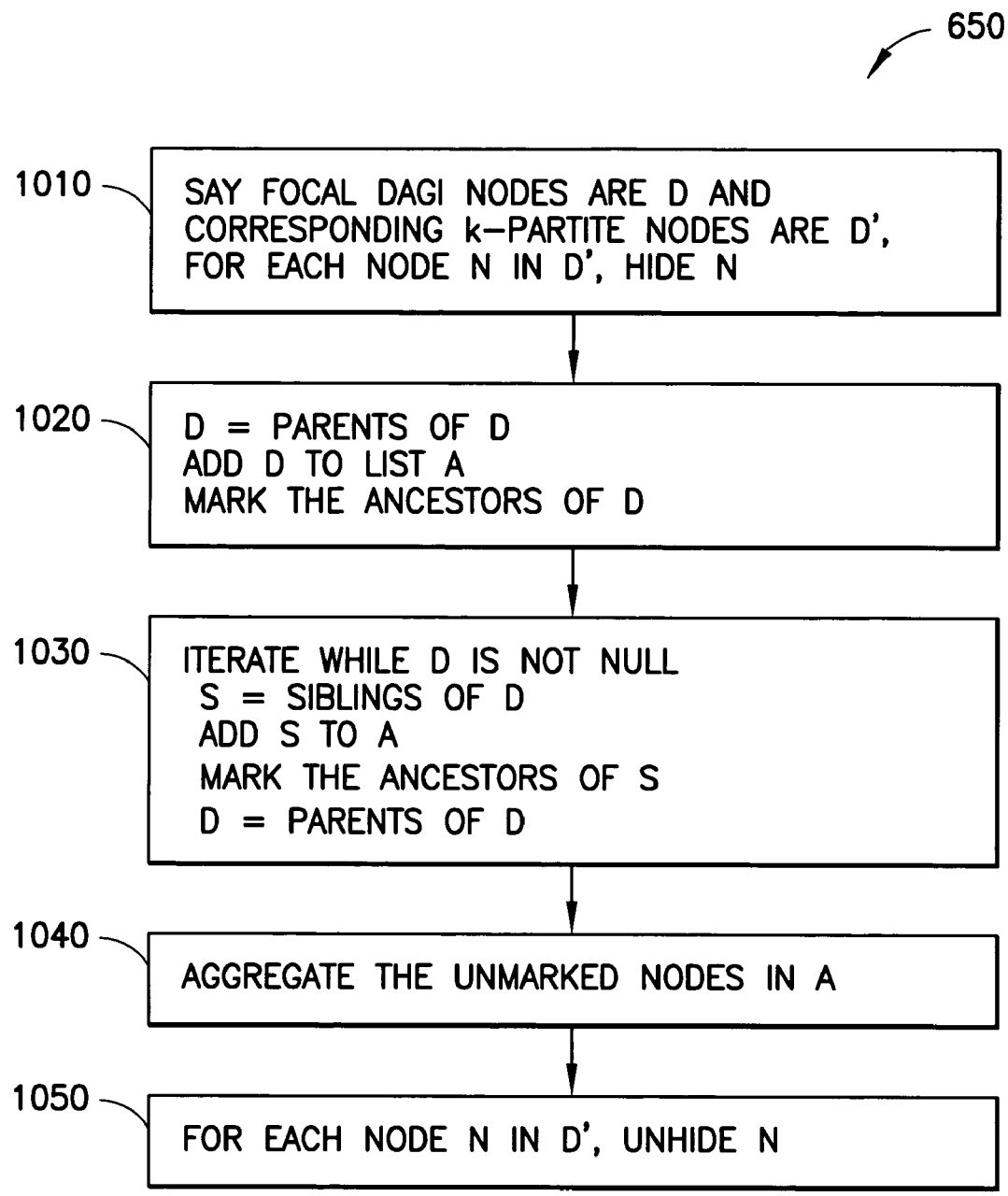
FIG. 10 is a flowchart describing a process of focusing the k-partite graph by automatically aggregating nodes.

FIG. 10 shows a flowchart showing the method steps of a preferred processes executed by the present invention. By executing the process specified in FIG. 10 650 the k-partite graph is simplified via automated aggregations using a DAGI. The goal is to provide an easy way for the user to specify what parts of the k-partite graph are of interest and then to automatically background the rest of the nodes by suitably aggregating them. The process begins in step 1010 by selecting some subset of the DAGI nodes as focal nodes; let this set of focal nodes be called D. Further, let D' be the set of nodes in the k-partite graph referred to by nodes in D. These nodes D' should not be aggregated since these are the nodes of primary interest. This is accomplished by hiding the nodes in D', thus guaranteeing they can not be aggregated until they are unhidden. In step 1020 a list of nodes to aggregate is begun called A. The parents of D are added to this list. This means if a node P has nodes Q, R and S as children and S was selected as a focal node, then P will be aggregated thereby forming a category node containing only Q and R, but not S. A further elaboration in step 1020 is that the ancestors of D are marked indicating that none of them should be aggregated. This step is necessary to ensure that no aggregations of aggregations occur. In step 1030 an upward sweep is made beginning from D which is the parents of the focal nodes. The upward sweep aims to not aggregate any aggregations, but to aggregate everything else. This is accomplished by aggregating the siblings of the parents and then the siblings of the grandparents and so on. Aggregating only the siblings and not the ancestors themselves means that aggregations of aggregations will not occur. Further guarantee of that is needed since directed acyclic graphs can have cross links that make a given node both an ancestor and a sibling of another given node. This guarantee is provided by explicitly marking all nodes which should not be aggregated, namely, ancestors of aggregated nodes. In step 1040 the unmarked nodes in A are aggregated. Finally, in step 1050 the focal nodes are unhidden thus showing them in relation to the aggregated nodes. This process is further described by the following psuedo code.

1. Let D be the focal DAGI nodes and D' be corresponding k-Partite nodes
2. for each node N in D' {

-continued

```
3.      hide N
4.    }
5.    D = Parents of D
6.    List A = D
7.    Mark the ancestors of D
8.    while (D != null) {
9.        S = Siblings of D
10.       Add S to A
11.       Mark the ancestors of S
12.       D = Parents of D
13.   }
14.   foreach node n in A {
15.       if unmarked(i)
16.           Aggregate(n)
17.   }
18.   foreach node n in D' {
19.       unhide(n)
20.   }
```

Figure 11:
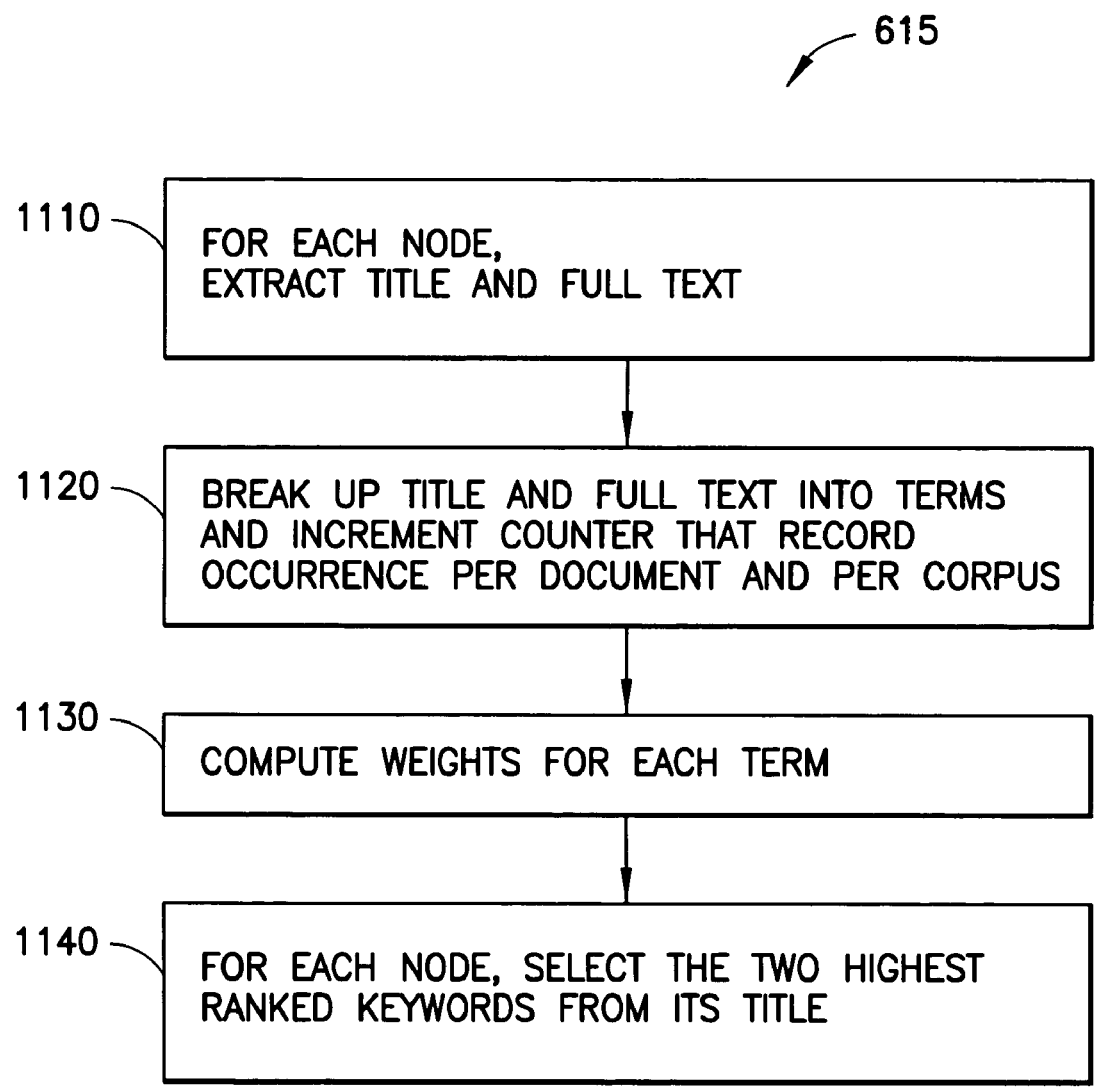
FIG. 11 is a flowchart describing the algorithm for deriving short labels for nodes that have text associated with them.

FIG. 11 shows a flowchart showing the method steps of a preferred processes executed by the present invention. By executing the process specified in FIG. 11 615 nodes associated with text are assigned a short label that aids in providing a overall view of the k-partite graph. The challenge is finding short titles that provide useful summaries. The basic idea is to take advantage of titles by extracting two terms from the title while using normalized weights derived from the text associated with all of the nodes. A term is either an individual word or consecutive word pair. The choice of which terms to extract from the title is based on an analysis of all the words associated with a node (e.g., the full text of a document) in concert with an analysis of all the words associated with all of the nodes in the graph. The process begins with step 1110 where the title and full text is obtained for each node. In step 1120 the title and fill text is broken up into terms (i.e., single words and consecutive word pairs) and the occurrence of these terms counted. The occurrence of terms is counted per document and a count is kept of how many of the documents associated with nodes contained the term at least once. In step 1130 normalized weights are computed for each term. The computation of the weights uses the following prior art formula:

$$\frac{tf(i) * \log(N/n(i))}{sqrt(\text{sum}[forall\ j,\ (tf(j) * \log(N/n(j)))^2])}$$

where tf(i) is the term frequency of term i in the current document

N is the # of documents n(i) is the number of documents in which term i appeared at least once tf(j) is the term frequency of term j in the current document, ranging over all j Finally in step 1140 a label is selected by rank ordering the terms by weight taking the top N where N is the desired label size. The preferred embodiment uses N=2. The resulting printable label is displayed by the Graphical User Interface 200 within or next to the node 220 when rendering the k-partite graph 125.

We claim:

1. A non-transitory computer readable medium storing instructions executable by a processor to perform a method for information processing, the method comprising the steps of:

collecting of a plurality of data objects in response to a query;

creating a k-partite graph representing the plurality of data objects, wherein each data object defines a node in the k-partite graph, such that, the nodes can be divided into a number of mutually exclusive sets such that each of the nodes are in exactly one of the sets, the k-partite graph further comprising one or more edges occurring only between nodes in different sets, each of the sets being a mode;

aggregating one or more of the nodes of one of the sets into one or more category nodes, where the category node becomes a member of the respective set and the category node inherits the edges of all the aggregated nodes in the respective set;

creating a directed acyclic graph index (DAGI) that contains one or more DAGI nodes connected to one another by one or more DAGI edges, one or more of the DAGI nodes corresponding to one or more of the categories, and one or more of the DAGI nodes corresponding to one or more of the nodes in the k-partite graph, and the DAGI edges establishing a hierarchy of containment of the DAGI nodes; and performing a simplification process comprising selecting one or more non-leaf DAGI nodes as one of the category nodes and using one or more descendent nodes of the non-leaf node to identify the nodes aggregated in the respective category, wherein the data objects corresponding to identified nodes aggregated in the respective category are returned as a result of the query.

2. The computer readable medium of claim 1, wherein the method further comprises:

identifying relationships between the data objects corresponding to identified nodes aggregated in the respective category; and returning the identified relationships as the result of the query.

3. The computer readable medium of claim 1, wherein the method further comprises collecting of the plurality of data objects in response to successive queries.

4. The computer readable medium of claim 1, wherein the method further comprises:

deriving node labels for the DAGI; and displaying the DAGI with the node labels.

5. The computer readable medium of claim 1, wherein the results are returned to a client of the processor, wherein the client is in electronic communication with the processor.

* * * * *